Mar. 3, 1925.

C. J. MEYER 1,528,449

PORTABLE PUMP AND MOTOR UNIT

Filed July 26, 1922     2 Sheets-Sheet 1

INVENTOR.
Christopher J. Meyer
BY
Erwin, Wheeler & Wool
ATTORNEYS.

Mar. 3, 1925.

C. J. MEYER 1,528,449

PORTABLE PUMP AND MOTOR UNIT

Filed July 26, 1922      2 Sheets-Sheet 2

Patented Mar. 3, 1925.

1,528,449

UNITED STATES PATENT OFFICE.

CHRISTOPHER J. MEYER, OF MILWAUKEE, WISCONSIN, ASSIGNOR TO EVINRUDE MOTOR CO., OF MILWAUKEE, WISCONSIN.

PORTABLE PUMP AND MOTOR UNIT.

Application filed July 26, 1922. Serial No. 577,496.

*To all whom it may concern:*

Be it known that I, CHRISTOPHER J. MEYER, a citizen of the United States, residing at Milwaukee, county of Milwaukee, and State of Wisconsin, have invented new and useful Improvements in Portable Pumps and Motor Units, of which the following is a specification.

This invention relates to improvements in portable pump and motor units.

It is an object of this invention to provide a pump adapted for use under adverse conditions, such as are encountered in the draining of building excavations, sewers and the like. More particularly it is the object of this invention to provide a portable pump, wherein a motor for driving the pump, the pump itself, and the motor supporting stand are united in a single unitary construction of such a nature as to be readily portable from place to place.

It is a further object of this invention to provide means for combining a water-cooled motor with a pump in unitary construction, whereby the pump will be driven by the motor, and a portion of the water delivered by the pump can be utilized for cooling the motor.

It is also an object of this invention to provide a simple portable pump and motor assembly, wherein the pump casing may be utilized as a support for a portable motor.

In the drawings:—

Like parts are identified by the same reference characters throughout the several views.

Figure 1:
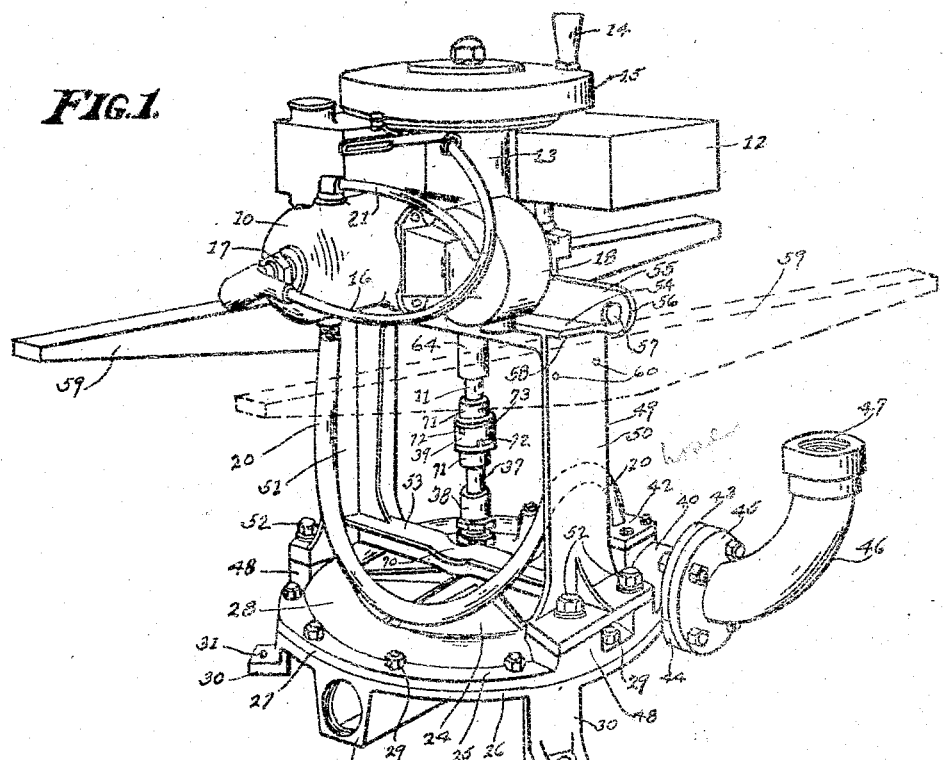
Figure 1 is a perspective view of a pump and motor as it appears when provided with carrying handles, one of said handles being shown in dotted lines in order not to confuse the showing of the construction of the motor supporting standard.

The motor illustrated in the drawings accompanying this application is of a standard type shown and described in the patent to O. Evinrude, #1,001,260, issued August 22, 1911, a portable motor which has hitherto been used almost exclusively for marine work. It will be understood that any portable motor of light weight and sturdy construction may equally well be used upon the standard hereinafter to be described, but inasmuch as the particular type of motor disclosed in the above identified patent has been found satisfactory for use in the motor and pump unit of my invention, this particular motor will be briefly described herein.

The motor illustrated is a two cycle, internal combustion engine having a cylinder 10 within which a piston reciprocates to drive a crank-shaft 11 in a well known manner. Fuel is supplied to the cylinder from a fuel tank 12 which partly surrounds the crank case 13. The cranking handle 14 secured to the fly wheel 15, which is mounted upon the upper end of crank-shaft 11, permits the motor to be started readily.

Ignition is preferably furnished by means of a magneto built into the fly wheel 15 in the manner disclosed in the patent to H. C. Mueller, #1,147,038, and issued July 20, 1915. The current thus developed is led through an insulated conductor 16 to a suitable spark plug 17 in the head of cylinder 10. The exhaust gases from the cylinder are delivered through a muffler 18, and the cylinder is preferably cooled by means of a water jacket 19 to which water is supplied through pipe 20 and is exhausted through pipe 21. It will be understood that the type of motor above described is well known in the art, and I do not desire to be limited to the specific motor herein illustrated.

It will be noted that the motor which has been described above is portable in the widest sense of the word. It is not only adapted to be carried readily from place to place but, since it includes a fuel tank and ignition system in its organization, it can be operated in any locality with entire independence of such sources of power as electric lines and the like.

The pump casing 24 is comprised of upper and lower castings 25 and 26, respectively, which are similar in construction. Each casting is provided with a peripheral flange 27, and each of them has its central portions bowed outwardly at 28 to provide a raceway for the centrifugal pumping element. Bolts 29 pass through the registering flanges 27 of castings 25 and 26 and secure the castings together.

The legs 30 integral with casting 26 maintain said casting in a slightly elevated position, and are provided with openings 31 through which bolts may be passed, if desired, to secure the entire unit rigidly in position. Because of the slight elevation of the pump, due to the provision of legs 30, room is afforded for a relatively large duct 32, the walls of which are also preferably integral with the lower casting 26. This duct leads beneath said casting to a point substantially at the center thereof where the duct is brought into communication through a central opening 33 with the interior of the pump casing. A bearing 34 is provided in the bottom wall of duct 32 for the shaft of the pump.

Figure 2:
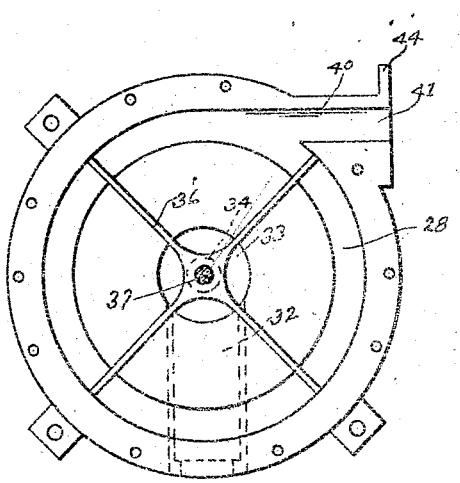
Figure 2 is a detail view of the lower plate or casting of the pump housing.
Figure 3:
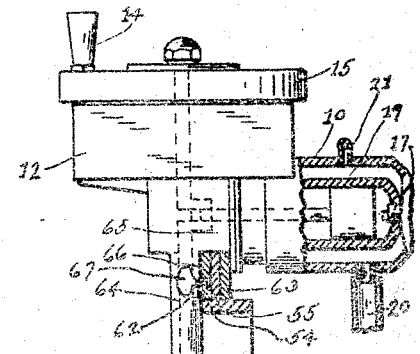
Figure 3 is a detail view of the motor and supporting standard in side elevation showing the means provided for securing the motor to the standard.

The centrifugal pump 36 may be of any desired construction, and is mounted upon a pump-shaft 37, the lower end of which is received into the bearing member 34 shown in dotted lines in Fig. 2. The pump-shaft 37 passes upwardly through the upper plate 25 of the pump casing and through a suitable stuffing-box 38. A coupling device 39 is used to secure together the motor-shaft 11 and pump-shaft 37.

At the rear of each of the plates 25 and 26, which constitute the pump casing, is an outwardly curving semi-cylindrical portion 40, said portions being adapted to register when plates 25 and 26 are folded together, to form a tangential outlet duct 41. A cover plate 42 affords access to the entrance to this duct, and the holes or pipe 20 may be led through the cover plate 42 to receive water under pressure of the pump to be used in the water jacket 19 for the purpose of cooling the motor cylinder.

Adjacent the end of duct 41, and carried by each of the semi-cylindrical portions 40 are semi-circular flanges 43 and 44 integral, respectively, with castings 25 and 26. These semi-circular flanges, when the pump casing is assembled, constitute together a complete circular flange to which may be bolted the flange 45 carried by the pipe fitting 46, to the threaded end 47 of which a suitable delivery pipe or hose may be connected.

The upper casing member 25 is preferably provided with upwardly projecting bosses 48 upon which is mounted a motor standard 49. This standard may comprise a single casting having upright members 50 and 51 provided with foot or base portions 51' secured to bosses 48 by studs 52. A stretcher 53 preferably connects upright members 50 and 51 at their lower extremities and a transverse member 54 is provided for the purpose of uniting the upper extremities of the uprights 50 and 51. The transversely disposed member 54, at the top of standard 50, includes an integral, upwardly projecting rail 55 affording means upon which the motor may readily be mounted. This rail is preferably extended to form ears 56, as shown in Fig. 1, which are provided with openings 57 to permit hoisting tackle to be secured to the device with facility. The horizontal portion 58 is also preferably extended beyond the outer faces of uprights 50 and 51, thereby providing a shoulder against which the carrying handles 59 may seat when such handles are used. Openings 60 in members 50 and 51 permit the introduction of bolts, whereby the carrying handles 59 may be secured in place. Each of the carrying handles projects upon both sides of the motor pump unit, and the ends of the handles are so spaced that a man may conveniently step between them and grasp the handles upon his either side, whereby two men can readily carry the entire unit.

Any desired means may be utilized for securing a standard motor to the upright rail 55 carried by transverse member 54. Ordinarily, portable motors of the type disclosed herein are provided with attaching means of the type represented by flanges 62 and 63 integral with the crank-shaft bearing member 64 and crank case casting 65, respectively. The clamping bolt 66 in threaded engagement with flange 62, and provided with a wing head 67 to permit of its ready manipulation facilitates the clamping of the upright rail 55 integral with the transverse member 54 of the standard 49 between flanges 62 and 63, and the consequent rigid mounting of the motor upon the motor standard 49.

Figure 4:
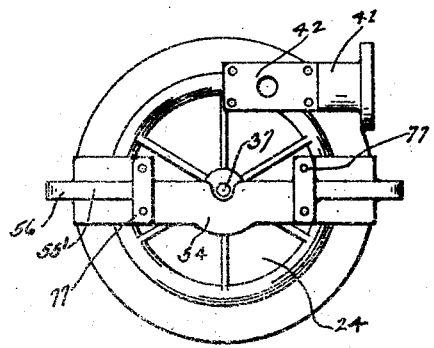
Figure 4 is a plan view of a pump casing and supporting standard similar to the corresponding elements shown in Figs. 1 and 3 but differing in details of the standard.
Figure 5:
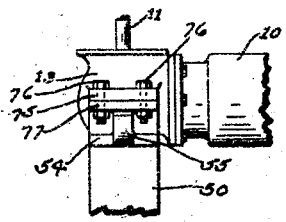
Figure 5 is a side elevation of a fragment of the standard shown in Fig. 4, with a motor crank case mounted thereon.

The form of standard shown in Figs. 4 and 5 is a slight modification of the device described above and it is adapted for use where the motor is especially constructed for use in the unit disclosed herein.

The standard 49 is, in the modified construction, made of such a height that the crank case 13 may rest directly thereon. A pair of out-standing apertured flanges 75 integral with crank case 13 are secured by bolts 76 to horizontal flanges 77 integral with the transverse member 54 and with the upright rail portion 55 thereof. This type of mounting is extremely rigid and is preferred wherever feasible. To use a standard motor upon this mounting it is only necessary to replace the crank case with a special crank case having the flanges 75.

It will be understood from the foregoing that each element comprising the motor and pump unit, above described, is of simple construction in itself, and is readily assembled to form an exceedingly simple and comparatively light portable unit.

It will further be noted that the entire device comprises three complete and independent units, namely, (1) the internal combustion engine including the fuel tank and ignition means forming a self contained power developing mechanism, (2) the frame or standard casting having uprights 50 and 51, stretcher 53 and transverse bar 54, the latter serving as the motor base, and (3) the pump casing serving as the base for the entire unit. By constructing the device in independent units, the same may be manufactured and assembled with facility, and moreover by having the motor united to the standard or frame casting by quickly detachable means such as the screws 67, the motor may be used for other purposes. Such a construction permits the standard, portable "Evinrude" motor to be quickly applied to the standard and to be removed therefrom for the purpose of repairing or for other uses.

The pump casing, including the inlet and outlet ducts thereof, includes but two castings. The outlet duct is so contrived that both of the castings contribute to the forming of the walls of the duct. The cover plate 42 affords ready access to the entrance of the outlet duct and permits the introduction in said entrance of suitable screens when the introduction of screens is desirable. The pipe or hose 20, in communication with the interior of outlet duct 41 through cover plate 42, permits the use of a portion of the water discharged from the pump for cooling purposes in the motor.

The standard 49 is a single box-like casting, inherently rigid, which may be reenforced, if desired, by suitable integral webs in the manner illustrated. The stretcher bar 53 which forms an integral part of the casting is preferably bowed at 70 to accommodate the stuffing-box 38 which surrounds pump-shaft 37 at that point. The transverse member 54 is similarly bowed to accommodate the crank-shaft 11 of the motor.

The rail 55 carried by the box-like standard 49 provides means for attaching commercially available types of portable motors, and also provides ready means for attaching motors specially designed for this service by the provision of flanges 75 as illustrated in Fig. 5.

It will be understood that by providing a motor which is in itself portable and readily removable from the supporting standard, I have made it possible for the entire device to be disassembled to facilitate its transportation. The openings 57 permit of the ready attachment of a sling where the motor is to be lowered into a deep excavation, and the shoulders 58 in combination with bolt opening 60 provide convenient means for attaching the carrying handles 59 when desired.

The coupling device 39 preferably includes elements 71 secured to the motor-shaft and the pump-shaft, and provided with radially disposed lugs 72 upon their opposed faces in the manner shown. The collar 73 is provided with radially disposed recesses staggered to receive the opposing lugs 72 in the manner illustrated in Fig. 1. Preferably the coupling is secured together only by the clamping of the portable motor upon rail 55 of the motor standard 49. Thereby a certain freedom of movement is permitted and the coupling device 39 constitutes a universal joint capable of transmitting to the pump-shaft 37 the rotation of crank-shaft 11 despite any inaccuracies in alinement which may exist.

This arrangement makes it possible to assemble or disassemble the motor from the remainder of the unit merely by the operation of thumb screws 67 or bolts 76. With the motor lowered into place upon the center of its supporting rail 55, a driving connection is automatically established between the motor and pump-shafts, and this connection is as readily broken by lifting the motor from the standard.

I claim:

1. A portable power pump and engine unit including a pump provided with a casing and an upright driving shaft, an open support connected to said pump casing, and an internal combustion engine and a fuel reservoir forming a complete self contained power developing mechanism detachably carried by said support in exposed position whereby access may be readily obtained to the same, said engine having the usual crank shaft, and means for coupling the crank shaft and the pump shaft.

2. A portable power pump and engine unit including a pump provided with a casing and an upright driving shaft, an open support connected to said pump casing, and an internal combustion engine and a fuel reservoir forming a complete self contained power developing mechanism carried by said support in exposed position whereby access may be readily obtained to the same, the support being carried by said pump casing, the latter being formed in sections, one of which is provided with supporting means for the unit, said engine having the usual crank shaft, and means for coupling the crank shaft and the pump shaft.

3. A portable power pump and engine unit including a pump provided with a casing and an upright driving shaft, an open support connected to said pump casing, an internal combustion engine including a fuel reservoir forming a complete self contained power developing mechanism carried by said support in exposed position whereby access may be readily obtained to the same, the support being carried by said pump casing, the latter having supporting means for the unit integrally formed therewith, said engine having the usual crank shaft, and means for coupling the crank and the pump shaft.

4. A device of the class described formed of three independent units; (1) an internal combustion engine including a fuel tank and a driving shaft all forming a complete power developing mechanism; (2) an open support carrying said first mentioned unit in exposed position, and (3) a pump including a casing upon which said support is carried and having a shaft coupled to said drive shaft, said three units being all connected and being supported as a composite unitary device by means beneath said pump casing and connected thereto.

5. A device of the class described formed of three independent units; (1) an internal combustion engine including a fuel tank and a driving shaft all forming a complete power developing mechanism; (2) an open support detachably carrying said first mentioned unit in exposed position; and (3) a pump including a casing upon which said support is carried and having a shaft coupled to said drive shaft, said three units being all connected and being supported as a composite unitary device by means beneath said pump casing and connected therewith.

6. A pump and motor unit including a casing comprising upper and lower castings, inlet and outlet duct portions formed in said castings, and leg members connected with the lower casting and arranged to support said casing in a horizontal position and in stable equilibrium.

7. A portable device including a centrifugal pump casing horizontally disposed and provided with supporting legs, in combination with a rectangular frame mounted upon said casing and including a lower member offset from the center of said casing, an engine carried by said frame and including a horizontal cylinder and a vertical shaft, a rotor within said casing, and a driven shaft connected with said rotor and projecting upwardly from said casing in the clearance afforded by the offset of said frame member and in substantial alignment and operative engagement with the shaft of said engine.

8. A power driven pump unit comprising a pump casing formed to serve as a base for the support of said unit, inlet and outlet ducts in communication with the interior of said casing, a removable plate affording access to the outlet duct, an internal combustion engine provided with a water jacket and with a crank shaft, a frame unitarily connecting said engine and said casing, a rotor within said casing, a pump shaft connected with the rotor and with the crank shaft, and a conduit affording communication through said removable plate between the outlet duct of said pump and the water jacket of said engine.

9. A power driven pump unit comprising a pump casing, a pump rotor, a frame rigidly connected with said casing, and an internal combustion engine mounted upon said frame and provided with a drive shaft operatively connected with said pump rotor, said frame including an upper member reenforced by a transversely extending rib provided upon opposite sides of said engine with apertures adapted to receive connections with a hoisting mechanism.

10. A pump and motor unit including a pump casing adapted to constitute a base for the unit and provided with inlet and outlet ducts, means within said casing for pumping a fluid through said ducts, a shaft operatively associated with said pumping means, a fluid cooled internal combustion engine arranged to drive said shaft, and means for by-passing to said engine a portion of the fluid delivered from said outlet duct.

11. The combination with a pump having inlet and outlet ducts and a rotatable shaft, of an engine having a crank shaft coupled to said pump shaft, and a cooling jacket in communication with the outlet duct of said pump.

12. A pump and motor unit including a centrifugal pump provided with a casing adapted to constitute a base for the unit, inlet and outlet ducts in communication with the interior of said casing, a pumping element rotatable within said casing and adapted to deliver fluid therethrough into said outlet duct, a pump-shaft operatively associated with the pumping element, an internal combustion engine provided with a water jacket and with a crank-shaft, means for supporting said engine from the casing of the pump, means for driving the pump-shaft from the crank-shaft, and a pipe putting the outlet duct of the pump into communication with the water jacket of the motor, whereby a portion of the pump will be by-passed into said water jacket.

13. A pump and motor unit including a pump casing adapted to constitute a base for the unit, a standard mounted upon the casing, a pump-shaft projecting vertically from the casing, a motor provided with a crank-shaft, quickly detachable means for mounting the motor upon the standard, and means for automatically establishing driving connections between the crank-shaft and the first mentioned shaft when the motor is so mounted.

14. A pump and motor unit including a casing adapted to constitute a base for the unit, a standard mounted upon said casing, a motor carried by the standard, shoulders projecting laterally from the standard, and means for securing carrying handles operatively beneath said shoulders.

15. A pump and motor unit including a pump casing, means at one side of the casing for supporting the unit, a standard mounted upon the casing at the other side thereof, a pump shaft projecting vertically from the casing, a motor provided with a crank shaft, detachable means for mounting the motor upon the standard, and coupling elements between said crank shaft and said pump shaft, said elements being held in normal coupling relation by said means for mounting the motor upon the standard.

16. A pump and motor unit including a pump casing, means at one side of the casing for supporting the unit, a standard mounted upon the casing at the other side thereof, a pump shaft projecting vertically from the casing, a motor provided with a crank shaft, detachable means for mounting the motor upon the standard, and readily separable complementary coupling elements between the crank shaft and said pump shaft, at least one of said elements being axially movable to permit ready removal and attachment of the motor.

17. A portable power pump and engine unit including a pump having a rotor, a casing for the pump, an upright pump shaft, a frame connected to said pump casing comprising side uprights and a cross bar extending between said uprights, a motor supported upon said cross bar, a motor shaft coupled to the pump shaft, means for connecting said motor to the cross bar, and lateral extensions on said frame adjacent said cross bar adapted to serve as means for moving the unit.

18. A portable power pump and engine unit including a pump having a rotor, a casing for the pump, an upright pump shaft, a frame connected to said pump casing comprising side uprights and a cross bar extending between said uprights, a motor supported upon said cross bar, a motor shaft coupled to the pump shaft, quickly detachable means for connecting said motor to the cross bar, and lateral extensions on said frame adjacent said cross bar adapted to serve as means for moving the unit.

19. A portable power pump and engine unit including a pump having a rotor, a casing for the pump, an upright pump shaft, a frame connected to said pump casing comprising side uprights, and a cross bar extending between said uprights, said uprights at their lower ends being formed with foot portions to which pump attaching means may be secured, a motor supported upon said cross bar, a motor shaft coupled to the pump shaft and quickly detachable means for connecting said motor to the cross bar.

20. A portable power pump and engine unit including a pump having a rotor, a casing for the pump, an upright pump shaft, a frame connected to said pump casing comprising side uprights and a cross bar extending between said uprights, a motor supported upon said cross bar, a motor shaft coupled to said pump shaft, means for connecting said motor to the cross bar, lateral extensions on said frame adjacent said cross bar adapted to serve as means for moving the unit, and supporting means for said unit beneath the pump casing, said means being connected to the pump casing.

21. A portable power pump and engine unit including a pump having a rotor, a casing for the pump, an upright pump shaft, a frame connected to said pump casing comprising side uprights and a cross bar extending between said uprights, a motor supported upon said bar, a motor shaft coupled to said pump shaft, and supporting legs for said unit formed integrally with said pump casing and located beneath the same.

22. A portable power pump and engine unit including a pump having a rotor, a casing for the pump, an upright pump shaft, a frame connected to said pump casing comprising side uprights and a cross bar extending between said uprights, a motor supported upon said bar, lateral extensions on said frame adjacent said cross bar adapted to serve as means for moving the unit, a motor shaft coupled to said pump shaft and supporting legs for said unit formed integrally with said pump casing and located beneath the same.

23. A device of the class described formed of three independent units; (1) an internal combustion engine including a fuel tank, and an upright driving shaft all forming a complete power developing mechanism; (2) an open support carrying said first mentioned unit in exposed position, and (3) a pump including a casing upon which said support is carried and having an upright shaft coupled to said drive shaft, said three units being all connected and being supported as a composite unitary device by means beneath said pump casing and connected thereto.

24. A device of the class described formed of three independent units; (1) an internal combustion engine including a fuel tank and an upright driving shaft all forming a complete power developing mechanism; (2) an open support detachably carrying said first mentioned unit in exposed position, and (3) a pump including a casing upon which said support is carried and having an upright shaft coupled to said drive shaft, said three units being all connected and being supported as a composite unitary device by means beneath said pump casing and connected thereto.

CHRISTOPHER J. MEYER.